US 006622654B2

(12) United States Patent
Fasino

(10) Patent No.: US 6,622,654 B2
(45) Date of Patent: Sep. 23, 2003

(54) WEIGHT-DISCRIMINATING BIRD FEEDER

(76) Inventor: Victor Fasino, 62 Oneida Ave., Landing, NJ (US) 07850

( * ) Notice: Subject to any disclaimer, the term of this patent is extended or adjusted under 35 U.S.C. 154(b) by 0 days.

(21) Appl. No.: 10/053,427

(22) Filed: Jan. 23, 2002

(65) Prior Publication Data

US 2003/0136347 A1 Jul. 24, 2003

(51) Int. Cl.[7] .............................................. A01K 39/01
(52) U.S. Cl. ..................................... 119/57.9; 119/52.3
(58) Field of Search ............................. 119/57.9, 51.01, 119/52.2, 52.4, 52.3, 57.8, 59, 63

(56) References Cited

U.S. PATENT DOCUMENTS

| | | | | | |
|---|---|---|---|---|---|
| 2,965,070 A | * | 12/1960 | Myrick | ...................... | 119/57.9 |
| 5,048,461 A | * | 9/1991 | Wessner | ...................... | 119/52.3 |
| 5,309,867 A | * | 5/1994 | Cruz | ...................... | 119/52.3 |
| 5,375,558 A | * | 12/1994 | Drakos | ...................... | 119/57.9 |
| 5,947,054 A | * | 9/1999 | Liethen | ...................... | 119/57.9 |
| 5,964,183 A | * | 10/1999 | Czipri | ...................... | 119/52.3 |

* cited by examiner

*Primary Examiner*—Peter M. Poon
*Assistant Examiner*—Son T. Nguyen
(74) *Attorney, Agent, or Firm*—Bernard J. Murphy

(57) ABSTRACT

Unattached weights, namely: balls, which are confined and obscured in a housing, are lifted by inner ends of pivotably mounted perches in response to an undesirable, rapacious, and weighty bird, or squirrel, alighting upon, or clasping at the outer, extending portions of the perches. The ball-lifting, perch ends are cradles, and the cradles and balls define a relative, rolling friction therebetween which, in cooperation with a mechanical advantage of the extending portion of the perches vis-a-vis the cradles, demonstrate a diminishing resistance as the perches rotate downwardly and dislodge the unwelcome creature.

12 Claims, 2 Drawing Sheets

WEIGHT-DISCRIMINATING BIRD FEEDER

This invention pertains to bird feeders, such as the public uses in suspension from poles or branches, to attract and feed birds—especially smaller, song birds—and in particular to a bird feeder which is weight-discriminating to deny feeding access to larger, undesirable birds, and squirrels.

Bird feeders which discriminate by denying feed access to squirrels and larger birds and use spring-loaded perches are well known. However, in such prior art feeders, self-evidently, the springs employed increase in resistance, as the perch controlled thereby has a bird or squirrel alight: thereupon. If such bird or squirrel can learn to bear with some movement of the perch, without departing in anxiety, it can manage to acquire feed (albeit with some discomfort). More efficient weight-discriminating bird feeders are those which have a given weight in control of the perch. Typical of these is the Bird Feeder disclosed in U.S. Pat. No. 5,207,181, by Selmer M. Loken. Another is the Squirrel-Proof Bird Feeder, by Julio V. Cruz, set out in U.S. Pat. No. 5,309,867. Peter Morganson disclosed a Squirrel Proof Bird Feeder in his U.S. Pat. No. 5,676,089 of Oct. 14, 1997, and Duane Green, in U.S. Pat. No. 5,921,201, also disclosed a Squirrel-Proof Bird Feeder, issue date: Jul. 13, 1999. Each of these four, patented bird feeders is efficient and capable of denying feed to squirrels, and large, undesirable birds, and each uses a weight for the purpose. However, in each, there is a fixed weight, or a weight of given grams which, with the use of tools, can be selectively displaced to adjust for a weight-borne response. In addition, each has external limbs or arms which are susceptible of interference with branches, as they are set astride the feeder, or depend from a side thereof. Too, these limbs or arms, for being external, are subject to rust and/or corrosion, and fracture.

What has been needed is a more efficient, weight-discriminating bird feeder in which there is an unattached weight, that is a weight movable within the feeder, and wholly confined and obscured within the housing assembly, and having no externalized limbs or arms other than the perches themselves.

It is an object of this invention to meet the aforesaid need. In particular, it is an object of this invention to disclose a weight-discriminating bird feeder comprising a housing assembly; said assembly having a seed reservoir; seed ports formed in said assembly; perches (a) pivotably mounted to said assembly, and (b) extending outwardly from said assembly in adjacency to said ports; and unattached weights wholly confined within and obscured within said assembly; wherein said perches comprise means, responsive to a weight-loading thereof by birds alighting thereon, for displacing said weights.

It is also an object of this invention to set forth a weight-discriminating bird feeder comprising a housing assembly; said assembly having a seed reservoir; at least one seed port formed in said assembly; at least one perch (a) pivotably mounted to said assembly, and (b) extending outwardly from said assembly in adjacency to said one seed port; and an unattached weight wholly confined and obscured within said assembly; wherein said one perch comprises means responsive to a weight-loading thereof by a bird alighting thereon for displacing said weight.

Further objects of this invention, as well as the novel features thereof, will become evident by reference to the following description, taken in conjunction with the accompanying figures, in which.

Figure 1:
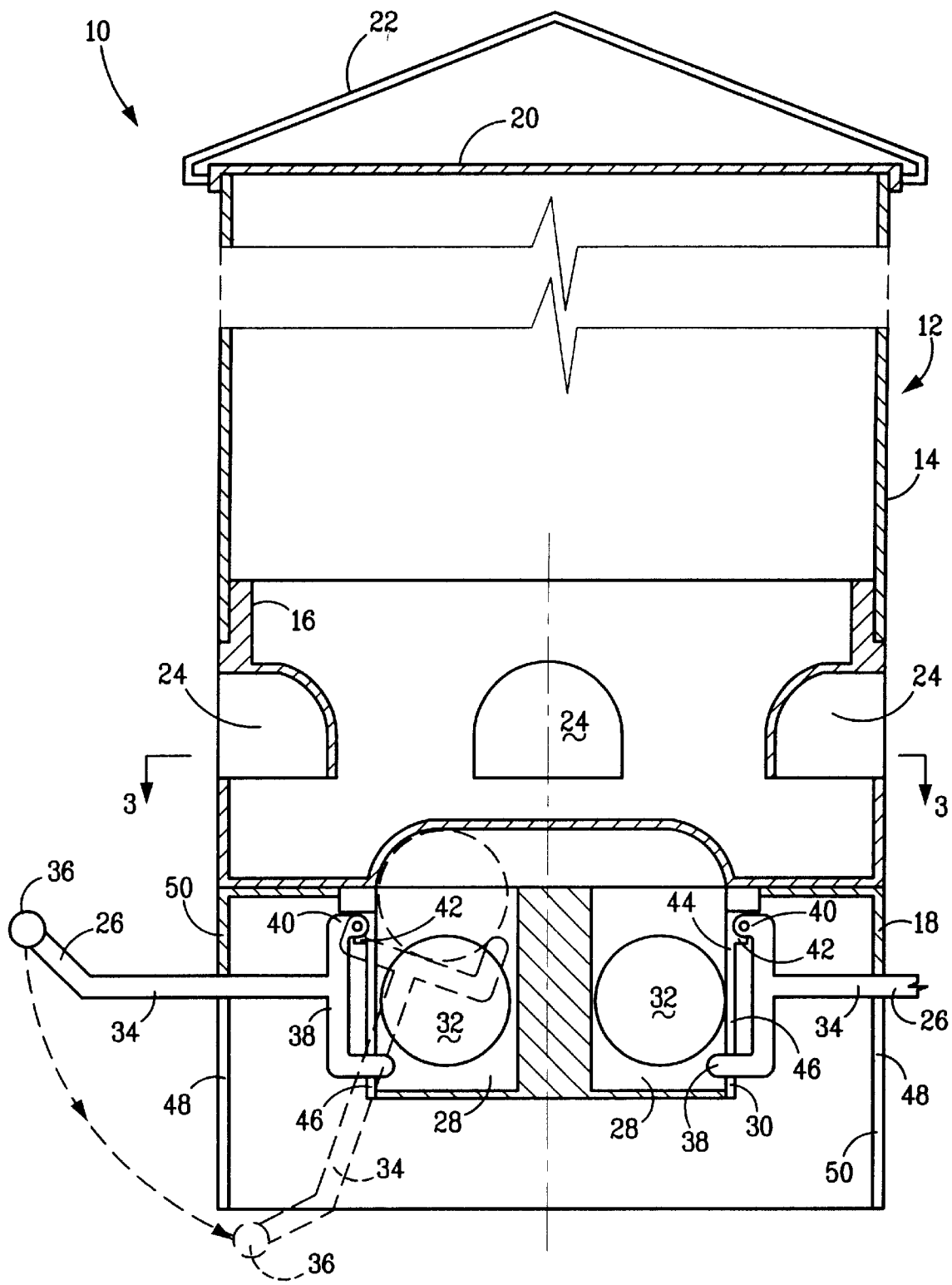
FIG. 1 is a vertical cross-sectional view of the novel bird feeder, according to an embodiment thereof.

As shown in the figures, the novel weight-discriminating bird feeder 10 comprises a housing assembly 12 formed of a seed reservoir 14 coupled to an underlying seed port subassembly 16, and then a lowermost weight and perch subassembly 18. A closure cap 20 is set upon the upper end of the reservoir 14, and a bail or hanger 22 is pivotably coupled to the housing assembly 12, for suspending the feeder 10 from a post or branch.

The reservoir is formed of a clear, plastic cylinder which has a length of not less than eighteen inches, for a significant reason. In that the reservoir 14 is clear, that is transparent, squirrels can readily see that it holds bird seed. Accordingly, these agile creatures will approach the feeder 10 from the top, and by hanging onto the hanger 22 by hind feet reach down to the seed ports 24 to acquire seed. However, common squirrels, albeit gymnastic, can stretch and reach only so far; by clinging to the hanger 22, and for having a given, natural length, they will be unable to bridge across eighteen inches of reservoir 14 to reach seed. Their reach will be frustrated, and they can only release the grip on the hanger 22, and slide down to a perch 26. In this circumstance, however, the perch 26 will simply swing down and come to a stop in an inaccessible position below and under the weight and perch subassembly 18. This functioning of the weight-discriminating bird feeder 10 is explained in the ensuing text.

Birds of course, need not maneuver themselves down the reservoir; they simply fly to a selected perch to avail themselves of seed. The novel feeder 10, though, is so configured that if the bird which alights upon a perch 26 is of light weight, the perch will support it, and permit it to feed. On the contrary, if the bird is a heavy, rapacious, undesirable bird, the latter will have the same experience as a squirrel. The perch 26 will swing down, rotating on a pivot, to come to rest in an inaccessible position below and beneath the weight and perch subassembly 18.

The feeder 10 discriminates as to weight, in this way. The weight and perch subassembly 18 has a plurality (in this embodiment, four) of compartments 28, the same being formed in a chamber 30 of the weight and perch subassembly 18. In each compartment 28 is confined an unattached ball 32. The perches 26 comprise a limb 34 and an outermost, end-terminating, short element 36, at one end thereof, and a cradle 38 at the inner portion thereof. The cradle 38 of each perch 26 is transverse to the length of limb 34. An upper lug 40 of the cradle 38 is pivotably joined to a tab 42 provided therefor in the circumscribing wall 44 of the chamber 30. The wall 44 has slots 46 formed therein to accommodate the entry of the cradles 38 thereinto for the purpose of lifting the balls 32. The balls 32 comprise the weights for weight-discriminating which sort of creatures will feed at the seed ports 24.

The limb 34, clearly, has a length which gives it a mechanical advantage over the cradle 38, so that the weight-loading which is applied to the end element 36—as by a bird alighted thereupon, or a squirrel clasping thereat—is enhanced and applies a greater force against the balls 32. Consequently, if the weight-loading is minimal, as will be the circumstance with a small, light song bird upon a perch 26, the cradle will not lift the ball 32. The perch will remain substantially undisturbed, and the small bird will be free to feed at a seed port 24 which is adjacent to its perch 26. On the contrary, if a squirrel applies its weight to a perch 26, or a large, undesirable and more weighty bird alights upon the perch 26, it is denied feed. The weight of the unwanted creature will force the cradle 38 to rotate on its pivot, swing into the relevant compartment 28, and lift the ball 32 therein. This is shown, in phantom in FIG. 1 where the cradle 38 has fully entered the slot 46 in the wall 44 and elevated the ball 32 in the compartment 28. Meanwhile, the outwardly extending end of the perch 26, that is the limb 34 and the terminating element 36, has rotated downwardly to an inaccessible position under and below the subassembly 18.

Obviously, if the perch were to be constrained in its normal positioning by a spring, the spring force would increase as the perch 26 proceeds to displace. If the creature can hold on, it may yet reach the seed port. In addition, springs are subject to wear and failure. In this invention, however, the resisting force is provided by unattached balls 32 which are not susceptible of wear and/or failure. Also, in contrast to the weight-governed prior art feeders, the ball-weights 32 are wholly confined and obscured within the weight and perch subassembly 18. Further, unexpectedly, the force which is required to cause the perch 26 to rotate out of reach, under and below the assembly 18, diminishes as the rotation proceeds. This is attributed to a combination of fortuitous circumstances: the mechanical advantage of the limb 34 over the cradle 38, the rolling friction between the cradle 38 and ball 32, and the changing disposition of the perch 26 as it rotates downward. Initially, the large bird, or squirrel, addresses the perch 26 directly, so that the inertia of the perch has to be overcome. As that happens, however, the perch 26 no longer directly affronts the creature; rather it proceeds to assume a diagonally disposed attitude, an angling downward which, with the inertia, now, of movement, requires less force to keep the perch 26 in movement. The inertia of movement, now combines with the mechanical advantage and the rolling friction to accelerate a depending attitude of the perch 26.

Figure 2:
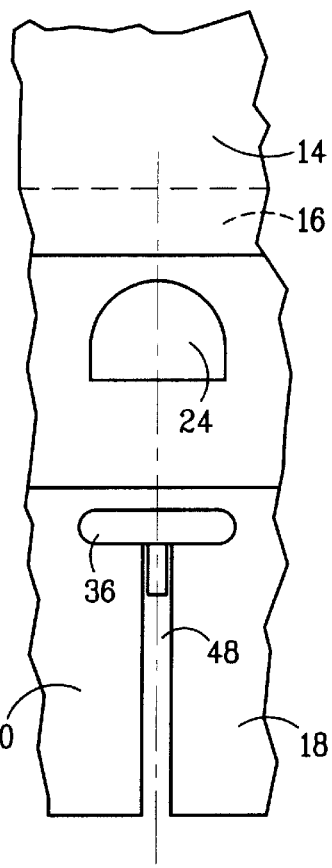
FIG. 2 is a fragmentary, side elevational view of the feeder of FIG. 1, the same showing a seed port which opens into a seed reservoir, and a perch.
Figure 3:
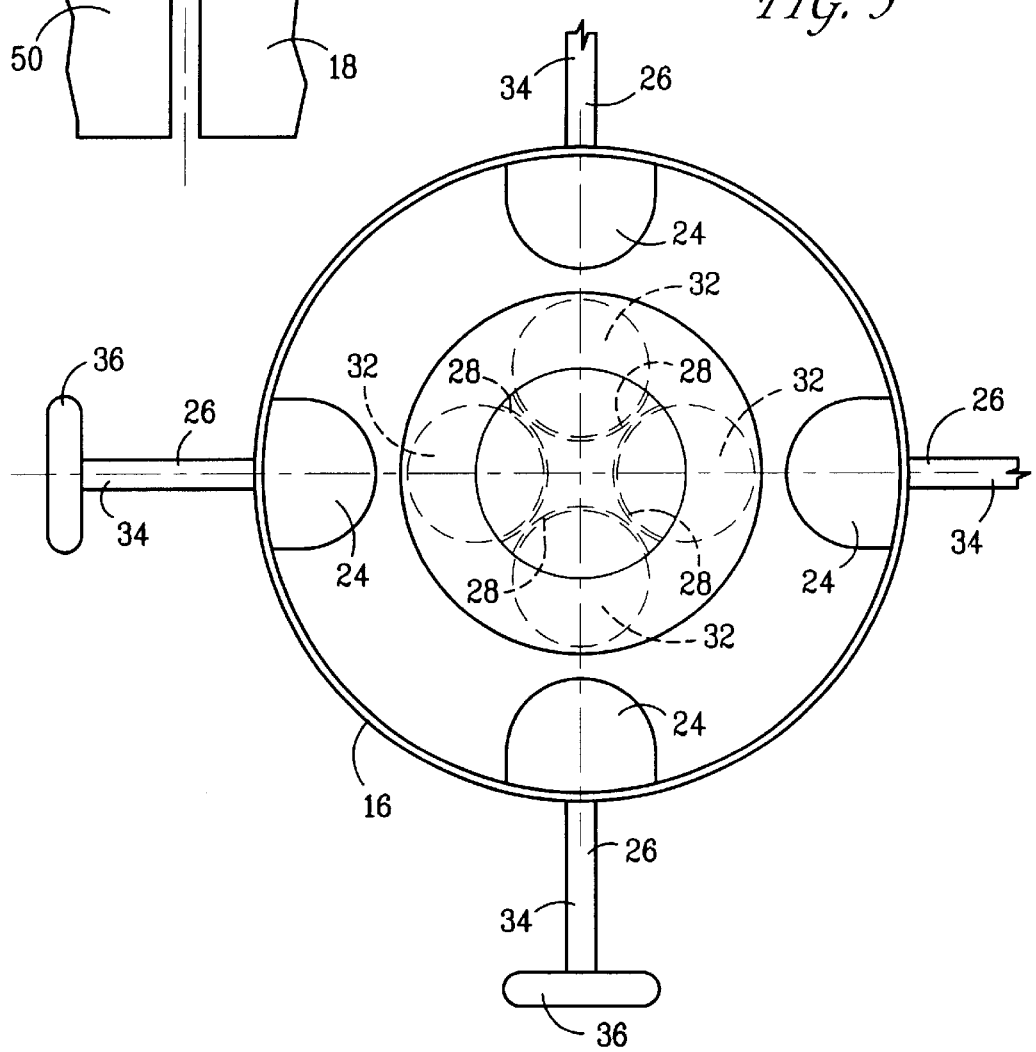
FIG. 3 is a view, taken along section 3—3 of FIG. 1, depicting four seed ports and the four, radially extending perches (two of which are shown foreshortened); this illustration looks upon the top of the weight and perch subassembly.

The weight and perch subassembly 18, as can be seen in FIGS. 1 and 2, has further slots 48 formed in the wall 50 thereof, in order that the limbs 34 of the perches 26 can rotate therethrough.

While I have described my invention in connection with a specific embodiment thereof, it is to be clearly understood that this is done only by way of example, and not as a limitation of the invention as set out in the appended claims.

I claim:

1. A weight-discriminating bird feeder, comprising:

a housing assembly;

said assembly having a seed reservoir;

seed ports formed in said assembly;

perches (a) pivotably mounted to said assembly, and (b) extending outwardly from said assembly in adjacency to said ports; and weights wholly confined and obscured within, and unattached to, said assembly; wherein said perches comprise means, responsive to a weight-loading thereof by birds alighting thereon, for displacing said weights;

said assembly further includes a chamber having a plurality of compartments formed therein;

each of said compartments confines therewithin one of said weights;

said perches are pivotably mounted to said chamber; and said weights-displacing means of each perch intrudes into one of said compartments for engagement with a weight therein.

2. A weight-discriminating bird feeder, according to claim 1, wherein:

said perches each have a first portion comprising a limb of a given length which terminates in a second portion comprising a structure which (a) is pivotably pinned to, and confined and obscured within, said assembly, and (b) has means for engaging and lifting one of said weights.

3. A weight-discriminating bird feeder, according to claim 2, wherein:

said engaging and lifting means defines a cradle in which to receive said one weight for lifting of the latter.

4. A weight-discriminating bird feeder, according to claim 3, wherein:

each said cradle and said weight, during lifting of said weight by said cradle, exhibit relative movement therebetween.

5. A weight-discriminating bird feeder, according to claim 4, wherein:

each said weight comprises a ball; and said movement comprises a rolling friction.

6. A weight-discriminating bird feeder, according to claim 2, wherein:

each said limb has, at an outermost end thereof, a short element, disposed transverse to said limb, for birds to grip while feeding at said feed ports; and said element, in response to a weight-loading of its associated perch by an undesirably weighty bird, or a squirrel, descends to an inaccessible position below and under said housing assembly.

7. A weight-discriminating bird feeder, according to claim 1, wherein:

said reservoir comprises a cylinder of not less than eighteen inches in length; and said seed ports are formed in said assembly, as aforesaid, below a lowermost end of said cylinder.

8. A weight-discriminating bird feeder, according to claim 1, wherein:

said seed ports occupy a given lowermost plane; and said weights are confined, and with displacement thereof remain, below said plane.

9. A weight-discriminating bird feeder, comprising:

a housing assembly;

said assembly having a seed reservoir;

at least one seed port formed in said assembly;

at least one perch (a) pivotably mounted to said assembly, and (b) extending outwardly from said assembly in adjacency to said one seed port; and a weight wholly confined, movable and obscured within, and unattached to, said assembly; wherein said one perch comprises means responsive to a weight-loading thereof by a bird alighting thereon for displacing said weight;

said assembly further includes a chamber having a compartment formed therein;

said compartment confines therewithin said weight;
said perch is pivotably mounted to said chamber; and
said weight-displacing means intrudes into said compartment for engagement with said weight therein.

10. A weight-discriminating bird feeder, according to claim 9, wherein:

said reservoir includes a cylinder of not less than eighteen inches in length; and said one seed port is formed in said assembly, as aforesaid, below a lowermost end of said cylinder.

11. A weight-discriminating bird feeder, according to claim 9, wherein:

said one perch has a first portion comprising a limb of given length which terminates in a second portion comprising a structure which (a) is pivotably pinned to said assembly, and (b) has means for engaging and lifting said weight.

12. A weight-discriminating bird feeder, according to claim 11, wherein:

said engaging and lifting means defines a cradle in which to receive said weight for lifting of the latter.

* * * * *